United States Patent
Delchen

[15] 3,707,626
[45] Dec. 26, 1972

[54] OPTICAL REFLECTOR

[72] Inventor: Robert John Delchen, 22 Beacon Grove, 31/33 High Street, Carshalton, England

[22] Filed: April 8, 1971

[21] Appl. No.: 132,490

[52] U.S. Cl. .................. 240/103 R, 240/41.35 R
[51] Int. Cl. ................. F21v 7/00, F21v 7/04
[58] Field of Search .......... 240/103, 41.3, 41.35, 41; 352/198; 353/102

[30] Foreign Application Priority Data

April 10, 1970 Great Britain ............. 17277/70

[56] References Cited

UNITED STATES PATENTS 2,187,071  1/1940  Bergmans ................. 240/41.3
2,183,249  12/1939  Schering et al. ........... 353/102 X
3,449,561  6/1969  Basil et al. ............. 240/41.35 R
3,539,798  11/1970  Perry .................... 240/41.3
1,163,192  12/1915  Adams .................... 352/198
3,308,715  3/1967  Ashcraft ................. 240/41 R
2,894,428  7/1959  Eber et al. .............. 240/41 R Primary Examiner—Robert P. Greiner
Attorney—Holcombe, Wetherill & Brisebois

[57] ABSTRACT

An optical reflector suitable for use in spotlights for projectors to direct light from a source through a gate to a lens system forming an objective. The reflector is so shaped that a substantial even field of illumination is obtained at the gate.

2 Claims, 1 Drawing Figure

PATENTED DEC 26 1972 3,707,626
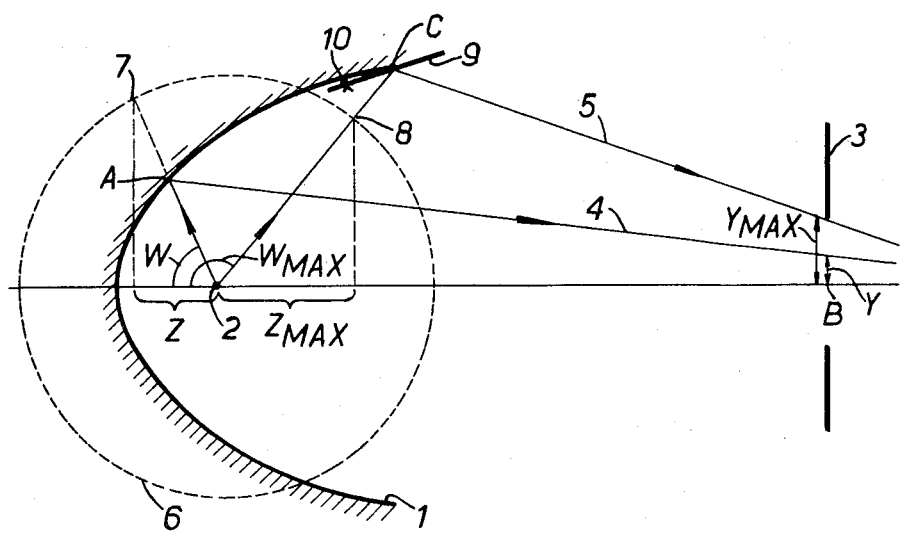

OPTICAL REFLECTOR

The present invention relates to optical reflectors and, in particular, to reflectors of the type used in spotlights or projectors.

Spotlights and projectors often employ reflector-condenser systems incorporating an elliptical mirror to direct light from a source through a gate to a lens or series of lenses forming an objective. The source is located at one focus of the elliptical mirror and the gate is located before the second focus, and all light from the mirror that passes through the gate converges towards the second focus and then passes to the objective which, in the case of a projector for example, focuses an image of the gate upon a screen.

It has been found that this type of system does not, in general, give an even field of illumination at the gate but, rather, that the light intensity is greatest at the center of the gate and decreases towards the edges. Accordingly, in the case of a projector for example, an unevenly illuminated image is obtained on the screen. This can, to some extent, be corrected by decreasing the size of the gate (the field of illumination becoming more even as the size of the gate is decreased) but this means that light is wasted.

The present invention provides an optical reflector for directing light from a point source to a gate, in which each point on the reflector surface is such that light from the source reflected from that point passes through the gate at a distance $Y$ from the center of the gate where $$Y = Y_{max} \sqrt{(1 - \cos W)/(1 - \cos W_{max})}$$

and $Y_{max}$ is the radius of the gate, $W$ and $W_{max}$ are the angles that lines joining the source to the point on the reflector surface and the source to a point on the edge of the reflector make with a line passing through the source and the center of the gate, whereby a substantially even field of illumination is obtained at the gate.

The present invention also provides a method of making an optical reflector for directing light from a point source to a gate, including the steps of determining a first plane reflecting surface which is such that light from the source reflected from a first point on the surface passes through the gate at a distance $Y$ from the center of the gate where $$Y = Y_{max} \sqrt{(1 - \cos W)/(1 - \cos W_{max})}$$

and $Y_{max}$ is the radius of the gate, $W$ and $W_{max}$ are the angles that lines joining the source to the first point and the source to a point on the intended edge of the reflector make with a line passing through the source and the center of the gate, determining a similar second plate reflecting surface for a second point on the first plane reflecting surface, repeating the steps to obtain a set of plane reflecting surfaces and forming a reflector in the shape of a smooth-curve-approximation to the set of reflecting surfaces.

The said first point may be located at the intended center of the reflector (that is, on the line passing through the source and the center of the gate) or on the intended edge of the reflector. Preferably the method is performed once with the first point located on the intended center of the reflector to determine one set of reflecting surfaces and a second time with the first point located on the intended edge of the reflector to determine another set of reflecting surfaces, and the reflector is formed in the shape of a smooth curve approximation to the two sets of reflecting surfaces.

The invention will be described, by way of example, with reference to the accompanying drawing which shows a section through a reflector constructed in accordance with the invention and illustrates a method of making the reflector.

The reflector 1 shown in the drawing directs light from a source 2 through a gate 3. The reflector may be used in, for example, a spotlight or a projector and would normally be employed in conjunction with a suitable objective positioned on the right-hand side of the gate 3 as seen in the drawing and, possibly, also with a suitable lens or lenses positioned between the reflector 1 and the gate 3. The shape of the reflector surface is such that a substantially even field of illumination is achieved over the whole area of the gate 3.

In the drawing, the line 4 indicates the path of a ray of light from the source 2, which is reflected at any point A on the reflector surface 1 and then passes through the gate 3 at a distance $Y$ from the center B of the gate. The line 5 indicates the path of a ray of light from the source 2, which is reflected at a point C on the edge of the reflector surface 1 and then just passes through the gate 3, that is, at a distance $Y_{max}$ from the center B of the gate where $Y_{max}$ is the radius of the gate. To achieve a substantially even field of illumination over the whole area of the gate 3, the shape of the reflector surface 1 should be such that, for each point A on the surface, $$Y = Y_{max} \sqrt{(1 - \cos W)/(1 - \cos W_{max})} \quad (1)$$

where $W$ and $W_{max}$ are the angles which the ray paths 4 and 5 respectively make with a line drawn between the source 2 and the center B of the gate, as shown in the drawing.

That a reflector shaped as defined above will give a substantially even field of illumination over the gate 3 can be seen from the following discussion. First, it is assumed that the light source 2 is a perfectly spherical radiator and although in practice, this will generally not be so, it has been found to be a reasonable assumption. All light emitted by the source 2 within the angle $2W_{max}$ passes through the gate 3 and all light emitted within the angle $2W$ passes through the gate within a radius $Y$ from the center B of the gate. If there is an even field of illumination over the gate then the amount of light passing within a radius $Y$ from the center B of the gate should be $(Y^2/y_{max}^2)$ of the total amount of light passing through the gate.

Now if a circle 6 of radius $R$ is constructed centered on the light source 2, and if points 7 and 8 are the points at which the ray paths 4 and 5 respectively before reflection would intersect the circle 6, then it can be shown that the ratio of the amount of light emitted by the source 2 within an angle $2W$ to the total amount is $(R-Z)/2R$ where $Z$ is the projection of the line 2, 7, as shown in the drawing. Similarly the ratio of the amount of light emitted by the source 2 within the angle $2W_{max}$ to the total amount is $(R + Z_{max})/2R$ where $Z_{max}$ is the projection of the line 2, 8, as shown in the drawing (the angle $W_{max}$ being obtuse). So, if there is to be an even field of illumination over the gate 3, the following relationship should be true:

$$(Y/Y_{max})^2 = (R-Z)/(R+Z_{max})$$

that is, $$Y = Y_{max} \sqrt{(1-\cos W)/(1-\cos W_{max})}$$

which is the relationship (1) above.

A reflector which satisfies the relationship (1) above to a substantial degree can be produced in the following manner. Firstly, the desired size of the gate 3; the position of the light source 2 and the size of the reflector 1 (in particular the position of the center and edge of the reflector) are decided having regard to the proposed use of the system. A suitable available elliptical reflector may, for example, be taken as a guide in deciding these matters. A line representing the path of a ray from the source 2, which just passes through the gate 3 after reflection at the chosen edge of the reflector is then constructed to yield the angle $W_{max}$. That is, the line 5 will be constructed. The bisector of the angle through which ray 5 is turned on reflection is then constructed, and the plane 9 to which this bisector is normal is considered and any suitable point 10 on this plane is chosen. It is then assumed that point 10 lies on the reflector and the path of a ray reflected at point 10 is constructed also using relationship (1) above, to yield a further bisector and plane. By repeating this process, a set of planes 9, etc can be produced approximating to a surface satisfying relationship (1): the greater the number of the planes 9. etc then the better will be the approximation, and from the approximation a satisfactory smooth surface can be derived.

An even better approximation can be derived by carrying out the construction procedure twice, once commencing at the chosen edge of the reflector and the second time commencing at the chosen center. This will yield two sets of planes 9, etc. and the final smooth surface should be made to lie between the two.

A mould can then be constructed in accordance with the smooth surface approximation thus derived and used to produce reflectors by, for example, spinning onto the mould.

It has been found that a reflector produced as described above will give a substantially even field of illumination over the gate. The light beam leaving the reflector does not come to a focus, but can be used to illuminate objects or cast an image on a screen at a distance which can be adjusted by the use of an appropriate objective. Modification of the shape of the beam leaving the reflector can be effected by the use of suitable lenses between the reflector and the gate, for example to accommodate changes in the focal length of the objective. This may necessitate adjustment of the position and size of the gate but it has been found that it is usually still possible to locate a plane of even illumination in which the gate may be located.

I claim:

1. An optical system comprising a gate, an optical reflector and a light source positioned on the line joining the centers of the gate and the reflector; the reflector being so shaped that a ray of light from a point source located at the said position would pass through the gate, following reflection at any point of the reflector, at a distance $Y$ from the center of the gate where $$Y = Y_{max} \sqrt{(1-\cos W)/(1-\cos W_{max})}$$

and $Y_{max}$ is the radius of the gate;

$W$ is the angle made by the said ray of light as it travels from said source to said one point on said reflector with that portion of said line joining the source and the center of the reflector, and $W_{max}$ is the corresponding angle between said line portion and a ray of light as it travels from said source to a point on the edge of the reflector from which it passes through the gate at a distance $Y_{max}$ from the center thereof, whereby a substantially even field of illumination is obtained at the gate.

2. An optical system according to claim 1, in which a beam of light from the said light source is convergent at the gate following reflection by the reflector.

* * * * *